US009279539B2

(12) United States Patent
Mochizuki et al.

(10) Patent No.: US 9,279,539 B2
(45) Date of Patent: Mar. 8, 2016

(54) MOVEMENT UNIT

(71) Applicant: THK CO., LTD., Tokyo (JP)

(72) Inventors: Hiroaki Mochizuki, Tokyo (JP); Eiji Hosaka, Tokyo (JP); Hiroomi Kuribayashi, Tokyo (JP); Akito Kaneko, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/405,358

(22) PCT Filed: Jul. 4, 2013

(86) PCT No.: PCT/JP2013/068387
§ 371 (c)(1),
(2) Date: Dec. 3, 2014

(87) PCT Pub. No.: WO2014/010507
PCT Pub. Date: Jan. 16, 2014

(65) Prior Publication Data
US 2015/0122963 A1 May 7, 2015

(30) Foreign Application Priority Data
Jul. 13, 2012 (JP) .................. 2012-157329

(51) Int. Cl.
*A47B 96/00* (2006.01)
*F16M 13/02* (2006.01)
(Continued)

(52) U.S. Cl.
CPC ............ *F16M 13/022* (2013.01); *B64D 11/00* (2013.01); *F16C 29/004* (2013.01); *F16C 29/008* (2013.01); *F16C 29/0623* (2013.01); *F16M 13/027* (2013.01); *B64D 2231/025* (2013.01); *F16C 29/063* (2013.01); *F16C 2326/43* (2013.01)

(58) Field of Classification Search
USPC .......... 248/424, 429, 220.21, 220.22, 223.41, 248/224.51, 224.61, 225.11
See application file for complete search history.

(56) References Cited

U.S. PATENT DOCUMENTS 5,373,635 A 12/1994 Nonaka et al.
6,049,988 A * 4/2000 Shirai ............... F16C 23/06
33/1 M
(Continued)

FOREIGN PATENT DOCUMENTS

JP 62-56660 A 3/1987
JP 2-93117 A 4/1990
(Continued)

*Primary Examiner* — Steven Marsh
(74) *Attorney, Agent, or Firm* — Westerman, Hattori, Daniels & Adrian, LLP

(57) ABSTRACT

Provided is a moving unit that enables a movable body to be smoothly moved along guide tracks for guiding the movable body across joints between a plurality of track rails arranged in series so as to serve as the guide tracks. The moving unit includes: the pair of guide tracks laid in parallel to each other; a plurality of moving blocks being two or more moving blocks assembled to each of the guide tracks and being freely movable along the guide tracks; and the movable body fixed to the moving blocks. The track rails arranged in series serve as the guide tracks, and each have a guide surface formed along a longitudinal direction of each of the track rails. The moving blocks each include contact elements configured to travel on the guide surface while passing across joint clearances each being formed between the track rails arranged in series.

4 Claims, 9 Drawing Sheets

(51) Int. Cl.
*F16C 29/00* (2006.01)
*B64D 11/00* (2006.01)
*F16C 29/06* (2006.01)

(56) References Cited

U.S. PATENT DOCUMENTS

| | | | | |
|---|---|---|---|---|
| 6,254,047 B1 * | 7/2001 | Dedrick | ............... | B65D 90/006 248/298.1 |
| 7,451,955 B2 | 11/2008 | Teramachi et al. | | |
| 8,763,978 B2 * | 7/2014 | Newman | ................ | F24J 2/5205 248/424 |
| 2010/0124457 A1 * | 5/2010 | Cook | ................. | B60N 2/01558 403/409.1 |
| 2014/0131543 A1 * | 5/2014 | Goto | ....................... | G10H 1/348 248/429 |

FOREIGN PATENT DOCUMENTS

| | | |
|---|---|---|
| JP | 5-133416 A | 5/1993 |
| JP | 7-269569 A | 10/1995 |
| WO | 2005/031082 A1 | 4/2005 |

* cited by examiner

MOVEMENT UNIT

TECHNICAL FIELD

The present invention relates to a moving unit for freely guiding a movable body such as various units and tables along a pair of guide tracks laid on a fixed portion in parallel to each other.

BACKGROUND ART

Hitherto, the moving unit of this type has been disclosed in WO 2005/031082. This moving unit disclosed in NO 2005/031082 is used for freely moving furniture items, electric appliances, and the like on a wall surface of buildings. This moving unit includes a pair of track rails being laid on the wall surface in parallel to each other and each having rolling surfaces for rolling elements, which are formed along a longitudinal direction of the track rails, a plurality of moving blocks assembled to the track rails through intermediation of a large number of the rolling elements that roll on the rolling surfaces of the track rails, and a movable body fixed to the moving blocks and guided along the track rails on the wall surface. Examples of the movable body may include a base plate for fixing electric appliances such as a television or furniture items, and casings themselves of the electric appliances. This moving unit enables such movable bodies to be freely moved on the wall surface.

Further, the moving unit of this type may be used to, for example, move various devices, interior equipment, and the like in a large space such as passenger cabins in aircrafts, ships, or trains so that those devices and interior equipment are arranged at arbitrary positions in the space. Specifically, in a passenger cabin of an aircraft, service units are provided correspondingly to respective seats. Those service units each contain emergency supplies such as an oxygen mask, and devices such as a seat number indication and a reading light are mounted to the service units. When those service units can be moved along a ceiling surface in the passenger cabin and fixed at arbitrary positions, an array pitch of the seats in the passenger cabin can be changed significantly easily.

In this case, in order to move the service units over the entire length of the passenger cabin of the aircraft, a plurality of track rails need to be arranged in series so as to form long guide tracks, to thereby move the moving blocks along the guide tracks while passing from one track rail to another.

CITATION LIST

Patent Literature

[PTL 1] WO 2005/031082 A1

DISCLOSURE OF THE INVENTION

Problems to be Solved by the Invention

In this context, large structures such as the aircraft and the ship are often manufactured by preparing a plurality of segments and lastly coupling those segments to each other, to thereby complete an intended large structure. In this case, in consideration of simplification of final assembly of the structure, it is inappropriate to fix the track rails while bridging over a coupling portion of the adjacent segments. Further, in the case of airliners, extensive interior furnishing of the passenger cabin is difficult to perform after completion of assembly of a fuselage. Thus, at the time of assembly of the fuselage, a plurality of fuselage segments are not welded to each other until a part of the interior furnishing, which is performed on each of the fuselage segments prior to the assembly of the fuselage, is progressed to some extent. Under the circumstances, in order to form long guide tracks in the large structure, it is appropriate to first fix the track rails to the segments, and then couple the segments to which the track rails are fixed, to thereby complete the long guide tracks in the large structure.

Thus, in consideration of the coupling of the segments, clearances need to be secured in advance between end portions of the track rails that are opposed to each other across the coupling portions. Further, in the case of the large structures such as the aircraft, the train, and the ship, there is a risk in that the segments thereof are deformed differently from each other when an external force is applied to those structures. When the plurality of track rails of the guide tracks are arrayed without securing the clearances between the end portions, there is another risk in that the end portions of the adjacent track rails significantly interfere with each other. Thus, also from such viewpoints, clearances may need to be secured in advance at joints between the adjacent track rails. Dimensions of the clearances, which are differently set depending on a size of a structure in which the track rails are laid, may be set to approximately ten and several millimeters. Those dimensions are clearly larger than a diameter of each of the rolling elements provided to the above-mentioned moving blocks.

In this way, in a case where the clearances are formed at the joints between the track rails of the above-mentioned guide tracks, when the moving blocks reach the joints between the track rails, the rolling elements fail to come into contact with the rolling surfaces of the track rails, and are brought into a non-load state. In this state, the moving blocks cannot bear loads of the rolling elements, and may be significantly displaced with respect to the track rails. As a result, the movable body supported by the moving blocks may be hindered from being smoothly moved.

Note that, the moving unit disclosed in Patent Literature 1 is described as an example of the devices for guiding the movable body to an arbitrary position along a given path, but the problems described above may occur also in moving units of such a type that the moving blocks including low-friction sliding contact members slide on the track rails, or such a type that the moving blocks including pivotally supported wheels travel on the track rails while rotating the wheels.

Means for Solving the Problems

The present invention has been made to solve the problems described above, and it is an object thereof to provide a moving unit that enables moving blocks to be smoothly moved along guide tracks for guiding a movable body across joints between a plurality of track rails arranged in series so as to serve as the guide tracks, to thereby enable the movable body to be smoothly moved with respect to a fixed portion.

Specifically, according to one embodiment of the present invention, there is provided a moving unit, including: a pair of guide tracks laid on a fixed portion in parallel to each other; a plurality of moving blocks including at least two moving blocks assembled to each of the pair of guide tracks, the plurality of moving blocks being freely movable along the pair of guide tracks; and a movable body fixed to the plurality of moving blocks and freely movable on the fixed portion. The pair of guide tracks includes a plurality of track rails each having a guide surface formed along a longitudinal direction of each of the plurality of track rails, and being arranged in series with their end portions connected to each other, whereas the plurality of moving blocks each include contact elements configured to travel on the guide surface while passing across joint clearances each being formed between the plurality of track rails arranged in series. Further, when one of the plurality of moving blocks is positioned at any one of the joint clearances each being formed between the plurality of track rails of the pair of guide tracks, another of the plurality of moving blocks is prevented from being positioned at another of the joint clearances.

Effects of the Invention

According to one embodiment of the present invention, under a state in which one of the plurality of moving members assembled to each of the pair of guide tracks is positioned at the joint clearance formed between the track rails arranged in series, the other of the moving members assembled to each of the guide tracks is not positioned at the joint clearance formed on the track rails. Thus, in a case where the movable body is moved along the guide tracks, at least three of the moving blocks are not positioned at the joint clearance formed on the track rails, but bear a load to be applied to the movable body. In this state, the movable body supported by those moving blocks can reciprocate in a stable posture along the guide tracks while passing across joints between the track rails.

MODE FOR CARRYING OUT THE INVENTION

Now, with reference to the accompanying drawings, detailed description is made of a moving unit according to an embodiment of the present invention.

Figure 1:
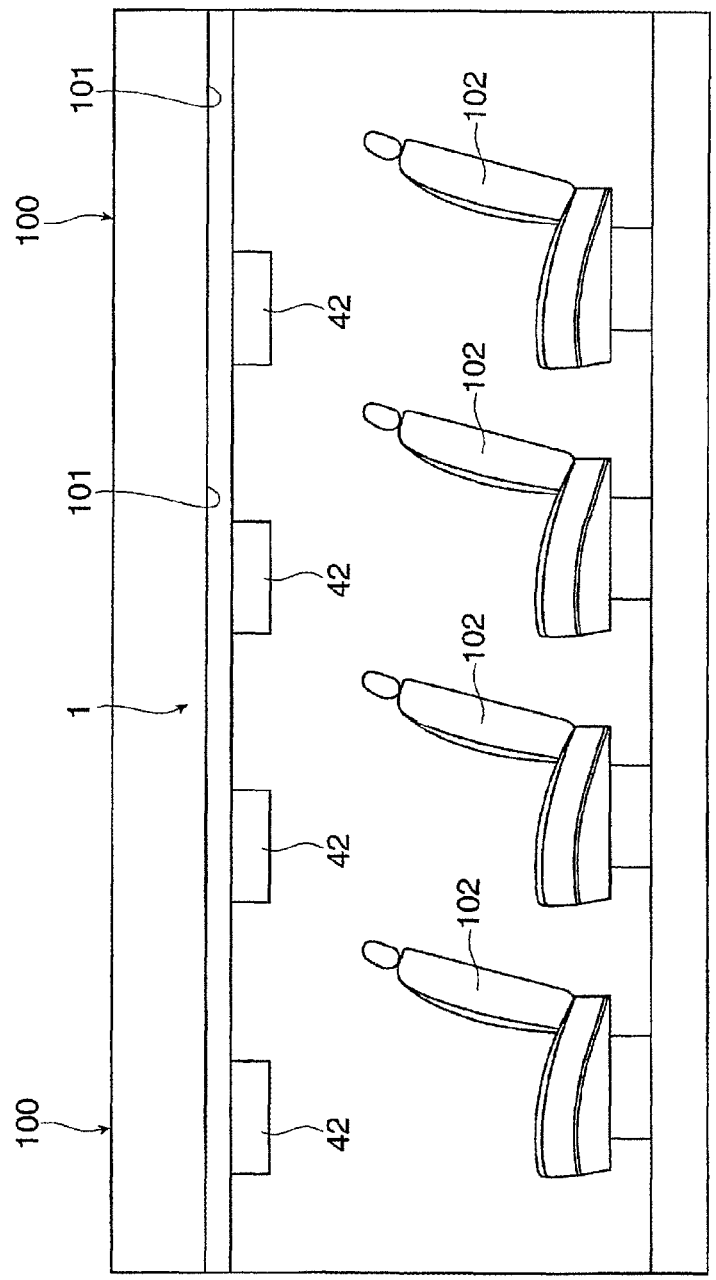
FIG. 1 is a schematic view of an application example of a moving unit according to the present invention.

FIG. 1 illustrates an example of how the moving unit according to the embodiment of the present invention is used. For example, in a passenger cabin 100 of an aircraft, service units 42 are arranged on a ceiling panel 101 of the passenger cabin 100 correspondingly to seats 102 for passengers. Those service units 42 each contain emergency supplies such as an oxygen mask, and include various indication devices mounted thereto, such as a seat number indication and a reading light. In general, an array interval of the seats 102 in the passenger cabin 100 of an aircraft is different from airline to airline that operates the aircrafts. Thus, aircraft manufacturers customize the array of the seats 102 in the passenger cabin 100 in accordance with requests from airlines. In view of the circumstances, from a viewpoint of the aircraft manufacturers, when the arrangement of the service units 42 can be freely customized in accordance with the array interval of the seats 102, and when the service units 42 can be freely removed from the ceiling of the passenger cabin 100 in accordance with an increase or decrease in number of the seats, convenience of assembly of aircrafts can be enhanced. Further, the service units 42 contain the emergency supplies, and hence regular maintenance inspection needs to be performed on the service units 42 themselves. Also from this viewpoint, when the service units 42 can be freely removed, convenience of the airlines that operate aircrafts is enhanced.

The moving unit according to the present invention satisfies such demands. Specifically, the service units 42 are arranged in a freely movable manner on the ceiling panel 101 as a fixed portion, and the service units 42 can be fixed at arbitrary positions on the ceiling panel 101. In addition, the service units 42 can be freely removed from the ceiling panel 101 as the fixed portion.

Figure 2:
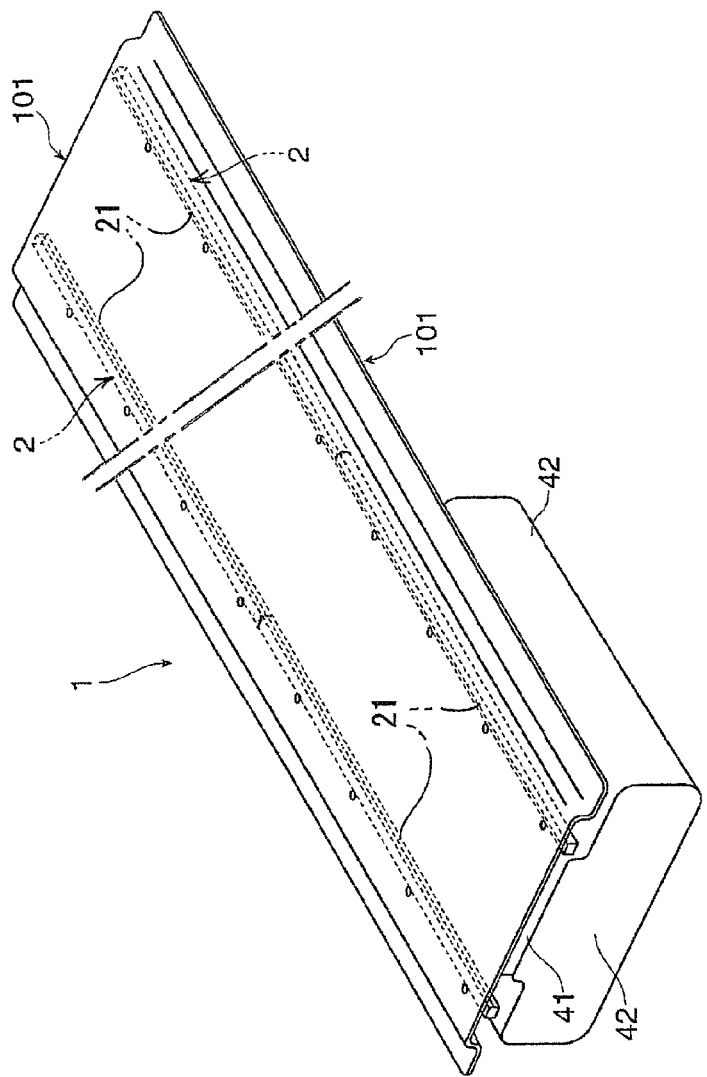
FIG. 2 is a perspective view of an example of the moving unit according to an embodiment to which the present invention is applied.
Figure 3:
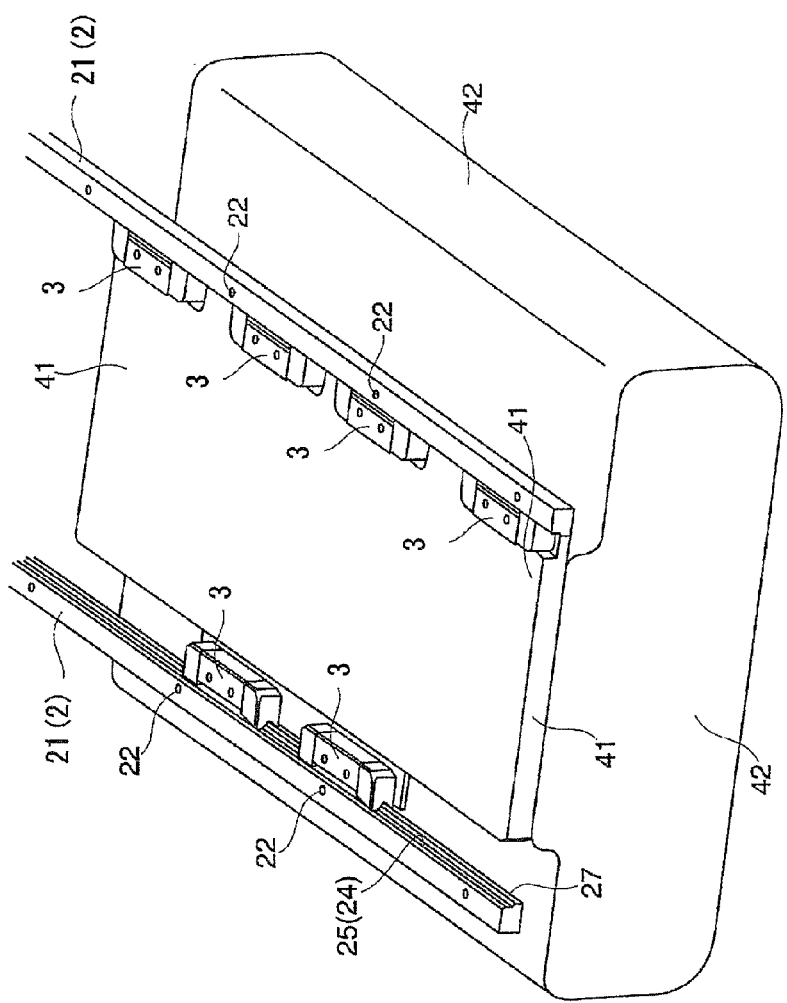
FIG. 3 is an enlarged perspective view of a main part of the moving unit to which the present invention is applied.

FIGS. 2 and 3 illustrate an example of a moving unit 1 according to the embodiment to which the present invention is applied. FIG. 2 is a perspective view of a state in which the moving unit 1 is used so that the service unit 42 is supported by the ceiling panel 101 as the fixed portion. FIG. 3 is a perspective view of a main part of the moving unit 1 without the ceiling panel 101.

The moving unit 1 includes a pair of guide tracks 2 laid in parallel to each other on the ceiling panel 101 as the fixed portion in the passenger cabin 100 of an aircraft, a plurality of moving blocks 3 assembled to each of the guide tracks 2, and a movable body 41 to which those moving blocks 3 are fixed. The guide tracks 2 each include a plurality of linear track rails 21 laid in series. When the number of track rails 21 to be laid in series is increased, the long guide tracks 2 can be formed in accordance with the entire length of the ceiling panel 101. Further, in order to form the guide tracks 2 to be even longer, a plurality of ceiling panels 101 may be arranged in series. The track rails 21 each have a guide surface 25 for guiding the moving blocks 3 along its longitudinal direction. With this, in a case where the plurality of track rails 21 are laid in series, the guide surfaces 25 of the track rails 21 are continuously aligned with each other. In this way, a single guide surface is formed over the entire length of each of the guide tracks 2.

In the example illustrated in FIG. 3, the pair of guide tracks 2 is arranged so that the guide surfaces 25 thereof are opposed to each other, and the moving blocks 3 fixed to the movable body 41 are assembled outward from an inside of the pair of the guide tracks 2. The moving blocks 3 each include contact elements to travel on the guide surfaces 25 of the track rails 21. Those contact elements function to enable the moving blocks 3 to freely move along the track rails 21 while bearing a load that is applied to the movable body 41. Then, under a state in which the moving blocks 3 are assembled to each of the guide tracks 2, the movable body 41 is prevented from dropping off from a position between the pair of guide tracks 2. Further, the moving blocks 3 are enabled to freely move over the entire length of the guide tracks 2 while sequentially passing across the plurality of track rails 21 laid in series.

In this way, the movable body 41 fixed to the moving blocks 3 can be freely moved along the guide tracks 2. In addition, when the service units 42 are fixed to the movable body 41, the service units 42 can be freely moved to arbitrary positions on the long ceiling panel 101. The movable body 41 is made of a metal material or a resin material.

Note that, in the example illustrated in FIGS. 2 and 3, the moving blocks 3 are fixed to the plate-like movable body 41 and the service unit 42 is fixed to this movable body 41. However, as a matter of course, the movable body 41 may be formed integrally with the service unit 42 and the moving blocks 3 may be fixed to the service unit 42 itself. Further, in the example illustrated in FIGS. 2 and 3, the moving blocks 3 of the present invention are applied to the service unit 42 in the passenger cabin 100 of an aircraft. However, an object to be fixed to the movable body 41 is not limited to the service unit 42. Further, in the following description, the ceiling panel 101 is used as the fixed portion to which the track rails 21 are laid. However, an object to which the track rails 21 are laid is not limited thereto, and as a matter of course, the object to which the track rails 21 are laid may include a wall surface, a floor, or other machinery equipment.

Figure 4:
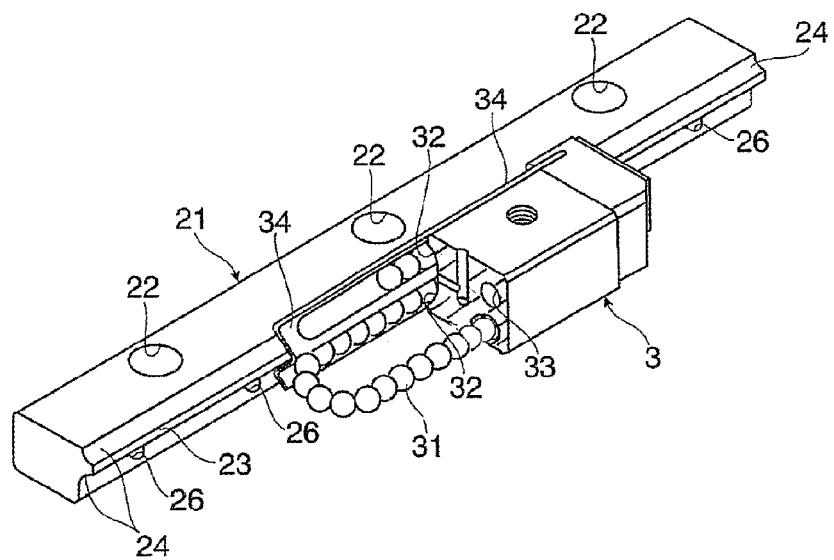
FIG. 4 is a perspective view of a combination of a moving block and a track rail that can be used in the moving unit of the present invention.

FIG. 4 is a perspective view of an example of a combination of the track rail 21 and the moving block 3. In the example illustrated in FIG. 4, the track rail 21 is formed into a substantially rectangular shape in cross-section perpendicular to the longitudinal direction thereof. Mounting holes 22 for fixing bolts are formed through the track rail 21 at predetermined intervals along the longitudinal direction. Those mounting holes 22 are used at the time when the track rail 21 is laid on the ceiling panel 101 as the fixed portion.

Further, on one side surface of the track rail 21, a projection portion 23 is formed along the longitudinal direction. On upper and lower sides with respect to this projection portion 23, a pair of rolling surfaces 24 for balls 31 is formed as the guide surface 25. Those ball rolling surfaces 24 are each inclined at an angle of 45° with respect to a bottom surface of the track rail 21, and the balls 31 roll on the pair of rolling surfaces 24 while sandwiching the projection portion 23.

Still further, a plurality of fixing holes 26 are formed through the track rail 21 at predetermined intervals in the longitudinal direction. Those fixing holes 26 are positioned between the projection portion 23 and the bottom surface of the track rail 21, and formed through side surfaces of the track rail 21. As described later, those fixing holes 26 are used at the time when the moving blocks 3 are fixed at arbitrary positions on the track rail 21.

Meanwhile, the moving block 3 include a large number of the balls 31 serving as the contact elements, and those balls 31 roll on the rolling surfaces 24 of the track rail 21. With this, the moving block 3 can be freely moved along the track rail 21. In the moving block 3, load-rolling surfaces 32 are formed in two rows so as to be opposed to the rolling surfaces 24 of the track rail 21. When the rolling surfaces 24 and the load-rolling surfaces 32 are opposed to each other, load ball paths are formed therebetween, through which the balls 31 roll while bearing a load between the track rail 21 and the moving block 3.

Further, the moving block 3 has endless circulation paths 33 in two systems for the balls 31 correspondingly to the load-rolling surfaces 32 in two rows. The endless circulation paths 33 couple both ends of the load ball paths, and each have an inner diameter set to be slightly larger than a diameter of each of the balls 31. Thus, after rolling on the load-rolling surfaces 32, the balls 31 roll on the endless circulation paths 33 under a non-load state, and then are returned onto the load-rolling surfaces 32. In other words, the balls repeatedly roll on the load ball paths through the endless circulation paths 33 so as to enable the moving block 3 to move over the entire region in the longitudinal direction of the track rail 21. Note that, in FIG. 4, for the sake of better understanding of how the balls 31 circulate in the moving block 3, half of the moving block 3 is not illustrated, and the balls 31 illustrated therein are those only in one of the two systems.

Still further, a retaining plate 34 is mounted to the moving block 3, and the retaining plate 34 is positioned between the moving block 3 and the track rail 21. The retaining plate 34 has a pair of opening portions formed so as to be opposed to the pair of rolling surfaces 24 formed on the track rail 21. Spherical surfaces of the balls 31 to roll on the load-rolling surfaces 32 of the moving block 3 are partially exposed from those opening portions and exposed parts of the spherical surfaces are held in contact with the rolling surfaces 24 of the track rail 21. A width of each of the opening portions is set to be smaller than the diameter of each of the balls 31. Even in a case where the moving block 3 is separated from the track rail 21, the balls 31 do not drop off from the moving block 3.

As described above, the guide tracks 2 are each formed by laying the plurality of track rails 21 in series. For example, in FIG. 2, the pair of guide tracks 2 is formed on the ceiling panel 101 as the fixed portion, and the guide tracks 2 are each formed of two track rails 21 laid in series. In this case, the two track rails 21 of each of the guide tracks 2 are laid on the single ceiling panel 101. Thus, no clearances need to be secured between connecting portions, that is, at joints between those track rails 21, and the two track rails 21 are laid on the ceiling panel 101 under a state in which the end portions thereof are held in contact with each other.

Figure 5:
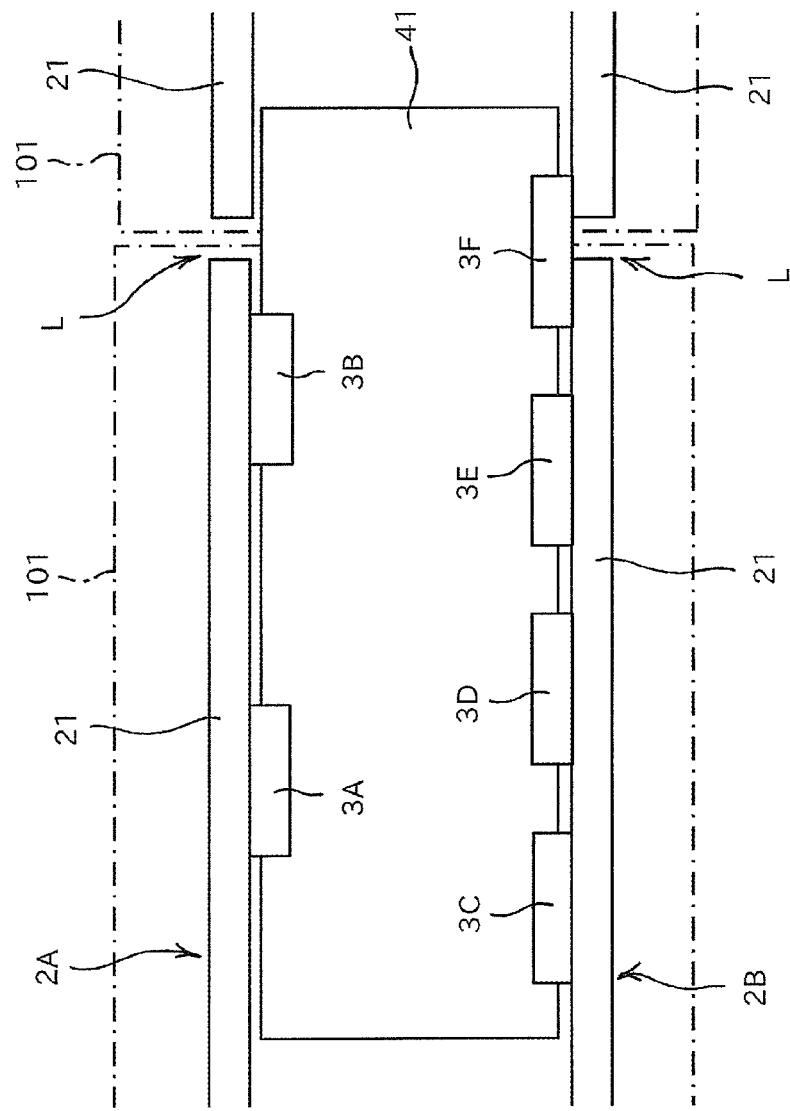
FIG. 5 is a schematic view illustrating an arrangement relationship between joint clearances on guide tracks and the moving blocks for a movable body.

However, in a case where the long guide tracks 2 are formed by arranging the plurality of ceiling panels 101 in series after laying the track rails 21 on each of the ceiling panels 101, as illustrated in FIG. 5, there is a risk in that gaps are formed between the end portions of the track rails 21 at joints between the ceiling panels 101. Further, in consideration of a risk of deformation of each of the ceiling panels 101, in order to avoid interference between the end portions of each of the track rails 21 at the joints between the ceiling panels 101, clearances L may need to be intentionally secured between the end portions of each of the track rails 21 (hereinafter referred to as "joint clearances L").

In a case where the movable body 41 needs to be moved over the entire length of the guide tracks 2 while passing across the joints between the ceiling panels 101, the moving blocks 3 fixed to the movable body 41 also pass across the joint clearances L between the track rails 21. However, dimensions of the joint clearances L reach approximately ten and several millimeters, which is larger in most cases than the diameter of each of the balls 31 serving as the contact elements provided in each of the moving blocks 3. Thus, when the moving blocks 3 come closer to the joint clearances L, there arises a risk in that the balls 31 are not held in contact with the rolling surfaces 24 of the track rails 21, and the moving blocks 3 cannot bear the load to be applied to the movable body 41. As a result, a posture of the movable body 41 may be unstable.

As a countermeasure, at the time of fixing of the moving blocks 3 to the movable body 41, arrangement of the moving blocks 3 on the movable body 41 is determined so that two or more of the moving blocks 3 do not simultaneously come to positions of the joint clearances L between the track rails 21. In the example illustrated in FIG. 5, six moving blocks 3A to 3F are fixed to the movable body 41, specifically, assembled to any one of the guide tracks 2A and 2B in two rows. More specifically, two moving blocks 3A and 3B are assembled to the guide track 2A, and four moving blocks 3C to 3F are assembled to the guide track 2B. Further, an array interval between the two moving blocks 3A and 3B assembled to the guide track 2A is different from an array interval between the four moving blocks 3C to 3F assembled to the guide track 2B.

The moving blocks 3A and 3B on the guide track 2A side are provided at position displaced from any one of the moving blocks 3C to 3F on the guide track 2B side. Specifically, in longitudinal directions of the guide tracks 2A and 2B, the moving blocks 3A and 3B on the guide track 2A side and the moving blocks 3C to 3F on the guide track 2B side are fixed out of phase with each other to the movable body 41. More specifically, in the example illustrated in FIG. 5, the moving block 3A on the guide track 2A side and the moving blocks 3C and 3D on the guide track 2B side are positioned in a triangular arrangement on the movable body 41, and the moving block 3B on the guide track 2A side and the moving blocks 3E and 3F on the guide track 2B side are positioned in a triangular arrangement on the movable body 41. Further, a length of each of the track rails 21 of the guide tracks 2A and 2B is set to be larger than the distance between the moving block 3C and the moving block 3D.

Thus, for example, when the moving block 3F on the guide track 2B side passes across the joint clearance L on the guide track 2B, the moving block 3B on the guide track 2A side has not yet reached the joint clearance L on the guide track 2A. Of the six moving blocks 3 fixed to the movable body 41, only the moving block 3F is positioned at the joint clearance. Meanwhile, when the moving block 3B on the guide track 2A side passes across the joint clearance L on the guide track 2A, the moving block 3F on the guide track 2B side has already passed across the joint clearance L, and the moving block 3E has not yet reached the joint clearance L. In other words, even when one of the six moving blocks fixed to the movable body is positioned at the joint clearance L on the guide track 2A or 2B, the other five moving blocks are assembled to the track rails 21 without reaching the joint clearances L.

Thus, even in a case where one of the moving blocks 3 is brought into a load unbearable state at the joint clearance L at the time when the movable body 41 passes across the joint clearance L, the other moving blocks 3 are assembled to the track rails 21 without being positioned at the joint clearances L. Thus, those moving blocks 3 can reliably bear the load to be applied to the movable body 41. With this, the movable body 41 can be stably moved over the entire length of the long guide tracks 2A and 2B.

Figure 6:
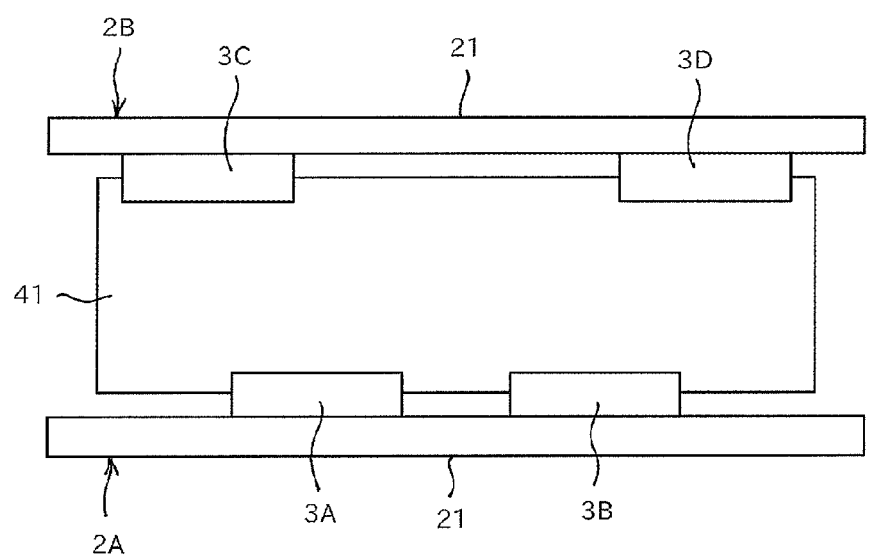
FIG. 6 is a schematic view of another example of an arrangement of the moving blocks on the moveable body.

The number of the moving blocks 3 to be fixed to the movable body 41 is not limited to six as long as two or more moving blocks are assembled to each of the guide tracks 2A and 2B. FIG. 6 illustrates an example in which four moving blocks 3A to 3D are fixed to the movable body 41. In this way, also in a case where the four moving blocks 3A to 3D are used, an array interval between the two moving blocks 3A and 3B assembled to the guide track 2A is different from an array interval between the two moving blocks 3C and 3D assembled to the guide track 2B. In other words, the moving blocks 3A and 3B on the guide track 2A side are fixed to the movable body 41 out of phase with the moving blocks 3C and 3D on the guide track 2B side.

Thus, even when the moving block 3D reaches the joint clearance L on the guide track 2B, the other moving blocks 3A to 3C are assembled to the track rails 21 without overlapping with the joint clearances. Thus, three moving blocks 3A to 3C can bear the load to be applied to the movable body 41. With this, the movable body 41 can be stably moved over the entire length of the guide tracks 2A and 2B.

In the examples illustrated in FIGS. 5 and 6, the array interval between the plurality of moving blocks 3 assembled to the guide track 2A on one side and the array interval between the plurality of moving blocks 3 assembled to the guide track 2B on another side are different from each other. With this, the plurality of the moving blocks 3 may avoid simultaneously coming to the positions of the joint clearances L. Alternatively, in order that the plurality of moving blocks 3 may avoid simultaneously coming to the positions of the joint clearances L, positions of the joint clearance L on the guide track 2A and positions of the joint clearance L on the guide track 2B may be intentionally displaced from each other.

Further, although not clearly illustrated in FIG. 4, ball leading surfaces are formed at both ends in a longitudinal direction of each of the rolling surfaces 24 of the track rails 21. Those ball leading surfaces are formed by performing a crowning process on end portions of the rolling surfaces 24. In regions in which the ball leading surfaces are formed, an interval between the moving block 3 and the rolling surface 24 becomes gradually larger toward the end portions of the track rails 21. Those ball leading surfaces are formed so as to enable the moving blocks 3 to smoothly pass across the joint clearances L. In a case where those ball leading surfaces are formed, when the moving blocks 3 pass across the joint clearances L, loads to be applied to the balls 31 interposed between the moving blocks 3 and the track rails 21 are gradually reduced, and then gradually increased. Note that, those ball leading surfaces may be arbitrarily formed on the rolling surfaces 24 of the track rails 21. Even in a case where those ball leading surfaces are not formed, the moving blocks 3 can pass across the joint clearances L.

The moving block of the present invention is not limited to the moving block illustrated in FIG. 4, specifically, a moving block of such a type that the endless circulation paths for the balls are formed and the balls roll on the rolling surfaces 24 of the track rails 21. For example, the moving block of the present invention may be a moving block of such a type that the moving blocks including low-friction sliding contact members slide on the track rails, or such a type that the moving blocks including pivotally supported wheels travel on the track rails while rotating the wheels.

Next, description is made of a position fixing member for fixing the movable body 41 at particular positions on the guide tracks 2A and 2B.

As described above, the movable body 41 can be freely moved to arbitrary positions on the guide tracks 2A and 2B. However, it is conceived that, in many situations of practical use of the movable body 41, the movable body 41 is not used while being moved with respect to the guide tracks 2A and 2B, but the movable body 41 is used while being fixed at the particular positions on the guide tracks 2A and 2B as described above by way of the example of the use in the passenger cabin 100 of an aircraft. Thus, the position fixing member may be provided to the movable body 41. This position fixing member is configured to restrict moving of the movable body 41 by using the fixing holes 26 formed at predetermined intervals along the track rails 21. An operator can fix the movable body 41 at arbitrary positions corresponding to the fixing holes 26 by moving the movable body 41 to particular positions on the guide tracks 2A and 2B, and then operating this position fixing member.

Figure 7:
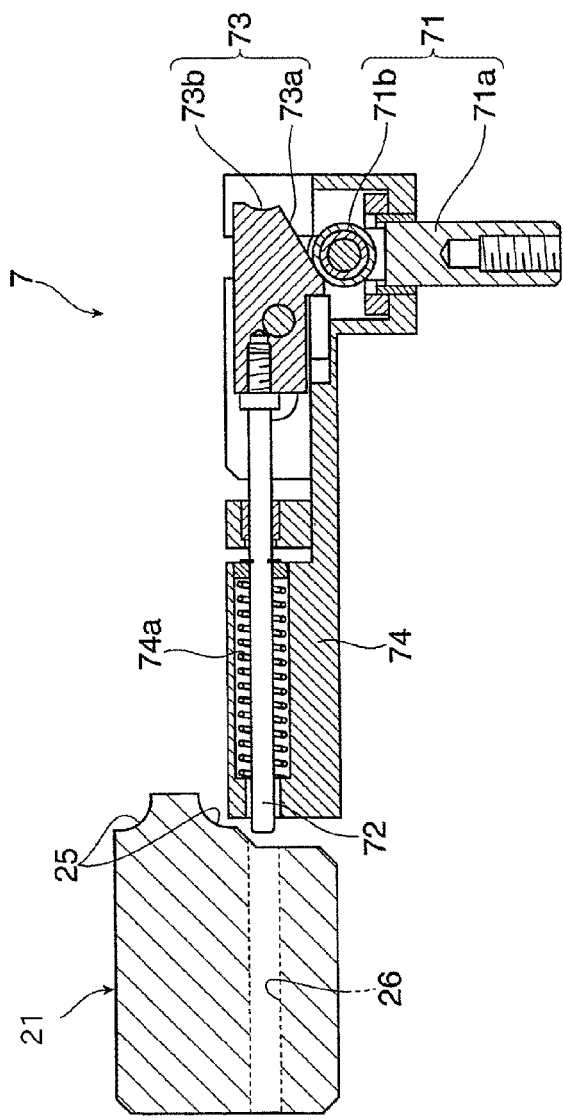
FIG. 7 is a sectional side view of an example of a position fixing member for the movable body.
Figure 8:
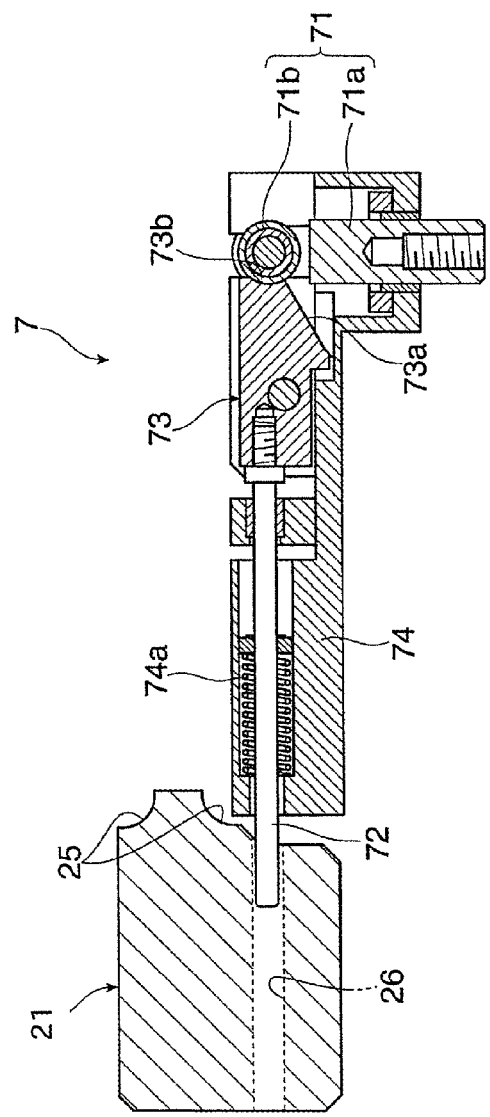
FIG. 8 is a sectional side view of an operating state of the position fixing member illustrated in FIG. 7.

FIGS. 7 and 8 are sectional side views of an embodiment of the position fixing member as viewed in the longitudinal direction of the track rails 21. FIG. 7 illustrates an initial state of the position fixing member, and FIG. 8 illustrates an operating state of the position fixing member. This position fixing member 7 includes an engaging pin 72 to be inserted into and retracted from the fixing holes 26 formed through the track rails 21, a setting pin 71 for switching the position fixing member 7 between the initial state and the operating state, a driven plate 73 for transmitting moving of the setting pin 71 to the engaging pin 72, and a housing 74 for housing the setting pin 71, the engaging pin 72, and the driven plate 73. The housing 74 is fixed to the movable body 41.

The setting pin 71 includes a shank portion 71a provided orthogonally to the engaging pin 72 and projecting from the housing 74, and a cam portion 71b provided in a freely rotatable manner at one end of the shank portion 71a. The shank portion 71a projects from the movable body 41 to an opposite side with respect to the ceiling panel 101, and a female thread is provided at a distal end thereof so that other members for pushing or pulling the shank portion 71a in an axial direction can be coupled thereto. Further, the setting pin 71 is held by the housing 74 so that the setting pin 71 can be freely moved in the axial direction of the shank portion 71a. Thus, a distal end of the setting pin 71 projects into, for example, the service units 42 illustrated in FIGS. 2 and 3 so that the setting pin can be operated from the service unit 42 side.

Meanwhile, the driven plate 73 is a member for converting the moving in the axial direction of the setting pin to a moving in a direction orthogonal thereto, and has an inclined portion 73a to come into sliding contact with an outer peripheral surface of the cam portion 71b of the setting pin 71, and a retaining portion 73b that is formed into a concave shape having substantially the same curvature as that of the outer peripheral surface of the cam portion 71 band is continuous with the inclined portion 73a. Further, the engaging pin 72 is a columnar member substantially coaxial with those of the fixing holes 26 of the track rails 21 and retained in the housing 74 so as to be freely movable in its axial direction. This engaging pin 72 is always urged by a coil spring 74a provided in the housing 74 into a direction away from the track rails 21. Further, a rear end of the engaging pin 72 is fixed to the driven plate 73, and the engaging pin 72 is inserted into and retracted from the fixing holes 26 of the track rails 21 in conjunction with moving of the driven plate 73.

In the initial state illustrated in FIG. 7, the engaging pin 72 is retracted from the fixing hole 26 of the track rail 21 by an action of the coil spring 74a. In this state, the position fixing member 7 is inactive at all, and hence the movable body 41 can be freely moved along the longitudinal direction of the track rails. At this time, the cam portion 71b of the setting pin 71 is held in contact with the inclined portion 73a of the driven plate 73.

In this initial state, when the setting pin 71 is pressed in the axial direction so that the setting pin 71 is pushed into the housing 74, the cam portion 71b rolls along the inclined portion 73a of the driven plate 73 to cause the driven plate 73 to be moved together with the engaging pin 72 against an elastic force of the coil spring 74a. In this way, a distal end of the engaging pin 72 is inserted into the fixing hole 26 of the track rail 21. Then, as illustrated in FIG. 8, under a state in which the setting pin 71 is fully pushed into the housing 74, the cam portion 71b rolls from the inclined portion 73a of the driven plate 73 onto the concave retaining portion 73b thereof. With this, the engaging pin 72 is moved out by a maximum amount with respect to the fixing hole 26 of the track rail 21. Further, in this state, the concave retaining portion 73b of the driven plate 73 is pressed against the cam portion 71b of the setting pin 71 by the elastic force pf the compressed coil spring 74a. Unless the shank portion 71a of the setting pin 71 is intentionally pulled back, the cam portion 71b is not separated from the retaining portion 73b of the driven plate 73, or the engaging pin 72 is not retracted from the fixing hole 26 of the track rail 21.

Thus, when the movable body 41 is moved to an arbitrary position along the guide tracks 2A and 2B, and the setting pin 71 is pushed at this position in the axial direction, the engaging pin 72 is inserted into the fixing hole 26 of the track rail 21. In this way, the movable body 41 is fixed at this position. Further, when the setting pin 71 is pulled back, the cam portion 71b is separated from the retaining portion 73b of the driven plate 73. In conjunction therewith, the engaging pin 72 is pulled back and retracted from the fixing hole 26 of the track rail. In this way, the movable body 41 can be moved along the guide tracks 2A and 2B again.

Meanwhile, the fixing holes 26 are formed at predetermined intervals through the track rails 21. Thus, even in a case where the movable body 41 is moved to an arbitrary position on the guide tracks 2A and 2B, it is uncertain whether or not the engaging pin 72 of the above-mentioned position fixing member 7 can be reliably inserted into the fixing hole 26 of the track rail 21 at that position. Thus, at the time of using the position fixing member 7, the operator needs to find a matching position between the engaging pin 72 and the fixing hole 26 by slightly moving the movable body 41 forward and rearward. As means for avoiding such troublesome operations, it is appropriate to introduce a position detecting member for accurately matching stop positions of the movable body 41 with the fixing holes 26 of the track rail 21.

Figure 9:
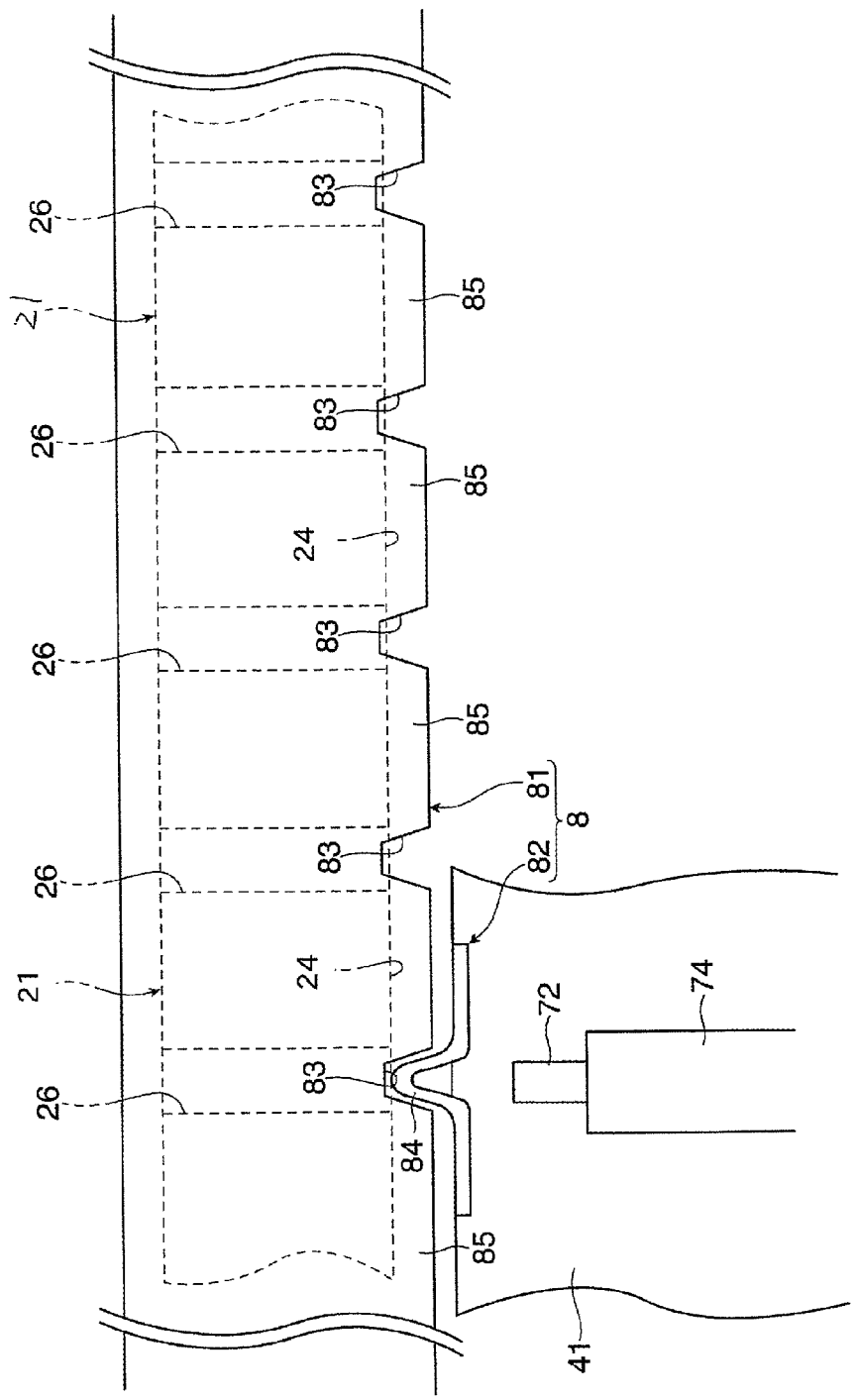
FIG. 9 is a schematic view of position detecting means of the movable body with respect to the guide track.

FIG. 9 illustrates an example of the position detecting member. This position detecting member 8 includes a reference plate 81 that is fixed to the ceiling panel 101 together with the track rails 21, and an elastic plate 82 that is fixed to the movable body 41 and moved along the guide tracks 2A and 2B together with the movable body 41.

The reference plate 81 is a long plate-like member provided along the longitudinal direction of the track rails 21, and has a plurality of engaging grooves 83 formed at equal intervals along the longitudinal direction. The engaging grooves 83 are formed at the same intervals as those of the fixing holes 26 of the track rails 21. The reference plate 81 is laid on the ceiling panel 101 together with the track rails 21 so that formation positions of the engaging grooves 83 and formation positions of the fixing holes 26 overlap with each other.

Meanwhile, the elastic plate 82 is formed by bending a thin plate, and has an engaging projection 84 to be fitted into the engaging grooves 83 of the reference plate 81. This elastic plate 82 is fixed to the movable body 41, and adjusted in fixing position so that a distal end of the engaging projection 84 enter the engaging grooves 83 of the reference plate 81, and that the engaging projection 84 overlaps with the engaging pin 72 of the position fixing member 7. The elastic plate 82 is formed by bending a thin plate, and hence is easily deformed. When the movable body 41 is moved under a state in which the engaging projection 84 is inserted in the engaging groove 83 of the reference plate 81, the engaging projection 84 is moved out of one of the engaging grooves 83, climbs onto a land portion 85 between the engaging grooves 83, and then re-enters subsequent one of the engaging grooves 83.

Thus, along with the moving of the movable body 41 along the longitudinal direction of the track rails 21, the engaging projection 84 of the elastic plate 82 is repeatedly moved into and out of the engaging grooves 83 of the reference plate 81 while being moved along the reference plate 81. With this, the operator who moves the movable body 41 can easily feel whether or not the engaging projection 84 is engaged with the engaging groove 83. Further, under a state in which the engaging projection 84 is engaged with the engaging groove 83, the engaging pin 72 of the position fixing member 7 is opposed to the fixing hole 26 of the track rail 21. Thus, the operator can easily insert the engaging pin 72 into the fixing hole 26 of the track rail 21 by operating the setting pin 71 of the position fixing member 7. In other words, at the time of moving the movable body 41 along the guide tracks 2A and 2B and fixing the movable body 41 to predetermined positions, the operator can easily recognize positions of the fixing holes 26 of the track rails 21. Thus, the operator can easily perform a fixing operation of the movable body 41 by using the position fixing member 7 described above.

The invention claimed is:

1. A moving unit, comprising:
a pair of guide tracks laid on a fixed portion in parallel to each other;
a plurality of moving blocks comprising at least two moving blocks assembled to each of the pair of guide tracks, the plurality of moving blocks being freely movable along the pair of guide tracks; and
a movable body fixed to the plurality of moving blocks and freely movable on the fixed portion,
wherein the pair of guide tracks comprises a plurality of track rails each having a guide surface formed along a longitudinal direction of each of the plurality of track rails, and being arranged in series with their end portions connected to each other,
wherein the plurality of moving blocks each comprise contact elements configured to travel on the guide surface while passing across joint clearances each being formed between the plurality of track rails arranged in series, and
wherein, when one of the plurality of moving blocks is positioned at any one of the plurality of joint clearances formed on the pair of guide tracks, another of the plurality of moving blocks is prevented from being positioned at another of the plurality of joint clearances.

2. The moving unit according to claim 1, wherein the plurality of joint clearances each being formed between the plurality of track rails each comprise a clearance larger than a diameter of each of the contact elements.

3. The moving unit according to claim 1,
wherein the plurality of track rails each have a plurality of fixing holes arrayed at predetermined intervals along the longitudinal direction of the each of the plurality of track rails, and
wherein the movable body comprises a position fixing member for restricting moving of the movable body with respect to the pair of guide tracks, the position fixing member comprising an engaging pin freely insertable into and retractable from any one of the plurality of fixing holes of the plurality of track rails.

4. The moving unit according to claim 2,
wherein the plurality of track rails each have a plurality of fixing holes arrayed at predetermined intervals along the longitudinal direction of the each of the plurality of track rails, and
wherein the movable body comprises a position fixing member for restricting moving of the movable body with respect to the pair of guide tracks, the position fixing member comprising an engaging pin freely insertable into and retractable from any one of the plurality of fixing holes of the plurality of track rails.

* * * * *